United States Patent
Hobson et al.

(10) Patent No.: US 6,317,152 B1
(45) Date of Patent: Nov. 13, 2001

(54) DIGITAL VIDEO RECORDING SYSTEM

(75) Inventors: Gregory L. Hobson, St. Charles; Jerry Moore; John R. Wooton, both of St. Louis, all of MO (US)

(73) Assignee: ESCO Electronics Corporation, St. Louis, MO (US)

( * ) Notice: Subject to any disclaimer, the term of this patent is extended or adjusted under 35 U.S.C. 154(b) by 0 days.

(21) Appl. No.: 09/356,129

(22) Filed: Jul. 17, 1999

(51) Int. Cl.[7] .............................. H04N 7/18; H04N 9/47
(52) U.S. Cl. ........................................... 348/150; 348/155
(58) Field of Search ........................... 348/143, 150–155, 348/156, 159, 699, 700; 375/240.01, 240.16; 386/112, 109, 124–125; 382/192, 283, 232, 234, 236; 356/124.5; 358/538, 539

(56) References Cited

U.S. PATENT DOCUMENTS

| | | | |
|---|---|---|---|
| 4,270,150 | | 5/1981 | Diermann et al. . |
| 4,520,401 | | 5/1985 | Takahashi et al. . |
| 5,229,850 | * | 7/1993 | Toyoshima ........................... 348/153 |
| 5,371,551 | * | 12/1994 | Logan et al. ......................... 386/112 |
| 5,510,897 | | 4/1996 | Ishida et al. . |
| 5,731,832 | * | 3/1998 | Ng ....................................... 348/155 |
| 5,864,649 | | 1/1999 | Shima . |
| 5,956,424 | * | 9/1999 | Wootton et al. ..................... 348/154 |
| 5,996,023 | * | 11/1999 | Winter et al. .................... 375/240.01 |
| 6,069,655 | * | 5/2000 | Seeley et al. ........................ 348/154 |
| 6,069,691 | * | 5/2000 | Rosow et al. ..................... 356/124.5 |
| 6,101,276 | * | 8/2000 | Adieletta et al. .................... 382/236 |
| 6,125,145 | * | 9/2000 | Koyanagi et al. .............. 375/240.16 |

* cited by examiner

Primary Examiner—Nhon T Diep
(74) Attorney, Agent, or Firm—Polster, Lieder, Woodruff & Lucchesi, L.C.

(57) ABSTRACT

A digital video recording system (10) includes a video camera (12) directed at a scene of interest to continuously view the scene and generate video images (F) of the scene at a predetermined frame rate. A frame grabber (16) converts the images to digital signal (vd). A processor (14) processes the signals, comparing the video image represented by a digital signal with a previously established reference (Fr) of the scene to determine if changes have occurred. The processor has a memory (20) in which contents of each digital signal are stored, together with the time and date information as to when the image was acquired. A video playback capability (30) allows the memory to be accessed to retrieve the contents of digital signals so video images produced by the camera can be recreated. The playback system enables the memory to be accessed at any desired date and time location so an image of interest can be reviewed without having to scan video images in a date/time sequence. Accessing the memory is done without interrupting the processor's processing of digital signals for currently acquired video images.

16 Claims, 4 Drawing Sheets

DIGITAL VIDEO RECORDING SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to video recording, and more particularly, to a digital video recording system for use at Point of Sale (POS) locations, Automated Teller Machines (ATM's), and other locations where the monitoring of activities is important.

Video recording equipment is in common use throughout industry and commerce. Conventional video recording systems are analog systems employing a video recorder which records images on a magnetic tape. The recorder used is a slow scan recorder whose video input is provided by a camera located at the POS or ATM. Recording is typically continuous over a predetermined period which is typically 24 hours. If nothing of significance occurs during the recording period, the tape is simply rerun again through the recorder with the prior recorded images being recorded over.

This process has a number of problems associated with it. In most installations, most of the time, nothing ever happens. Rather, the same tape is used over and over with the same background image being recorded over and over. Only if something of significance happens is the tape removed and replaced. Preferably, each tape should be removed, degaussed, and reinserted in the recorder at the end of each recording interval. Or, each tape is changed every day with the tape removed being degaussed before its next use. However, this is seldom done because of the expense or impracticality of doing so.

Because the same images are continuously being recorded, over time, the magnetic particles in the tape tend to align themselves in a particular orientation consistent with those images. This residual magnetization degrades the resolution capability of the tape and resulting quality of the recorded images. One problem law enforcement officers or security personnel have with the recording systems described above is that the poor quality of the recorded images makes it difficult to discern features or details of the events captured on the tape, including the identification of persons.

Another problem with conventional recording systems is that simply because an event of significance has occurred, recording does not stop. Thus, in order to view the event, it is necessary to rewind the tape and scan through it to the place where the event is recorded. In situations where time may be critical, the resulting delay is very undesirable.

BRIEF SUMMARY OF THE INVENTION

Among the several objects of the present invention may be noted the provision of a digital video recording (DVR) system and apparatus for use in recording tansactions and other occurrences sufficiently important that it is desirable to record them. The DVR system replaces conventional analog tape recording systems now in use, the system employing a personal computer (PC) based processor and frame grabber with a camera such as currently used in conventional video recording systems. The computer and frame grabber replace the video tape recorder now being used.

It is another object of the invention to provide a system which captures and stores high resolution images, and maintains the quality of the stored image regardless of the amount of time elapsed from when the image was recorded, regardless of the number times which the image is viewed, and regardless of how often the media on which the image is stored is overwritten. Additionally, the system allows prior recorded images to be played back repeatedly; even while a digital video recorder of the system is recording current images from a camera, and in which the playback speed of a recorded image can differ from the speed at which images are currently being recorded.

A further object of the invention is a system in which recorded images are date and time stamped so the search for an image to play back can be directed immediately to a location in the memory rather t and by a linear rewind/fast forward search such as is done with conventional recording systems. Viewing of a stored image is done either locally or at a remote location. If done remotely, the image is transmissible over standard telephone lines without a degradation in image quality.

Another object of the invention is a DVR system in which recorded images are compressed so to greatly increase the storage capability of the system. Image compression ratios are not constant, but rather are determined by various system factors. A compression algorithm is selected for compressing the image as a function of image content, location of the image within a scene being recorded, and the quality, resolution, and threshold of the compressed image, etc.

Yet another feature of the system is that images are authenticated for future usage as evidence of a crime, for example. Authentication prevents tampering with the recorded material.

Additionally, the DVR system of the present invention is readily expandable so the processor can process inputs from multiple cameras with image processing not being degraded. Memory capacity of the system is readily expanded This enables the system to provide continuous coverage for multiple cites with a separate camera being located at each site, but with image processing being accomplished at a remote location so monitoring at any particular site is not compromised.

In accordance with the invention, generally stated, a digital video recording system is for use at ATI machines, POS locations and the like. A video camera is directed at a scene of interest. The camera continuously views the scene and generates video images of the scene at a predetermined frame rate. A frame grabber converts the video images produced by the camera to a digital signal. A processor processes the digital signals, and in doing so compares the video image represented by a digital signal with a previously established reference of the scene, and determines if any changes have occurred therein. The processor includes a memory in which the compressed video image is stored together with time and date information as to when the image was acquired. A video playback capability allows the memory location where an image of interest is stored to be directly accessed to retrieve the image. The playback system enables the memory to be accessed at any desired date and time location so an image of interest can be reviewed without having to scan video images in a date/time sequence. Further, accessing the memory is done without interrupting the processor's processing of digital signals for currently acquired video images. The system can also be used with multiple cameras. Other objects and features will be in part apparent and in part pointed out hereinafter.

BRIEF DESCRIPTION OF THE SEVERAL VIEWS OF THE DRAWINGS

In the drawings.

Corresponding reference characters indicate corresponding parts throughout the drawings.

DETAILED DESCRIPTION OF THE INVENTION

Figure 1:
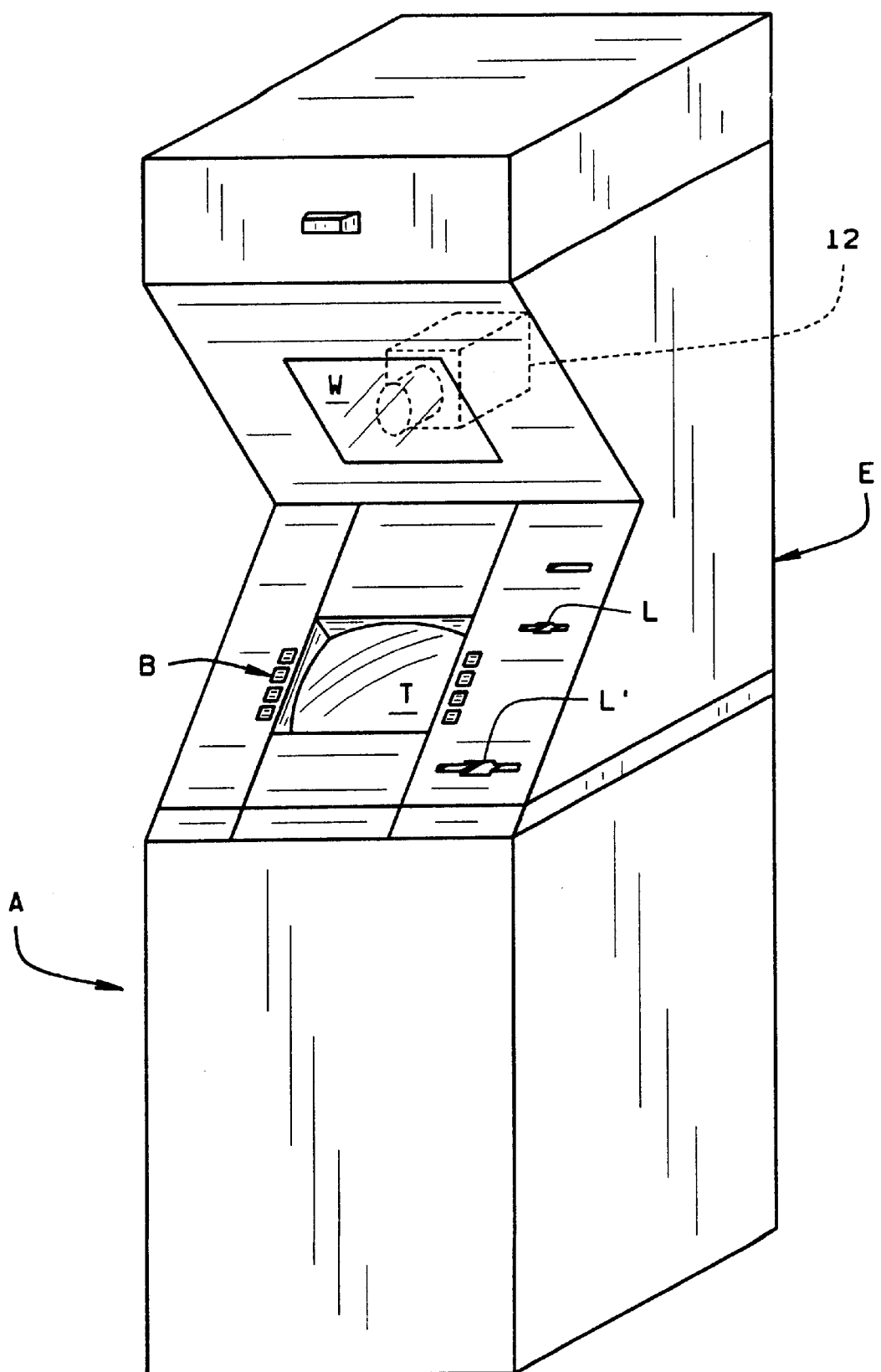
FIG. 1 is a representation of an installation with which the DVR system of the present invention is used.
Figure 2:
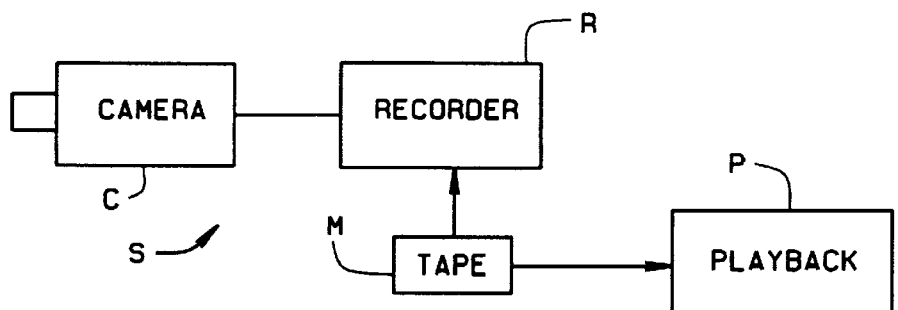
FIG. 2 is a simplified block diagram of a prior art recording system.

Referring to the drawings, a conventional monitoring system S utilizes a camera C which views a scene of interest. In security systems, this could be the interior of a bank, an ATM machine, the counter of a fast food store, etc. Video images produced by the camera are transmitted to recorder R which can be on the premises or remotely located. The images are recorded on a magnetic tape M or the like. When the tape is fill, it is rewound and recorded over; or it is stored away and replaced with a new tape. If something of consequence occurs, in order to view it, the tape is transferred to a playback unit P where it is rewound to the beginning. The tape is then scanned to the point where recordation of the occurrence commences for viewing by interested parties. As noted, if the tape is simply recorded on over and over, the recorded image is degraded and vital information may be lost or rendered incomprehensible.

Figure 4:
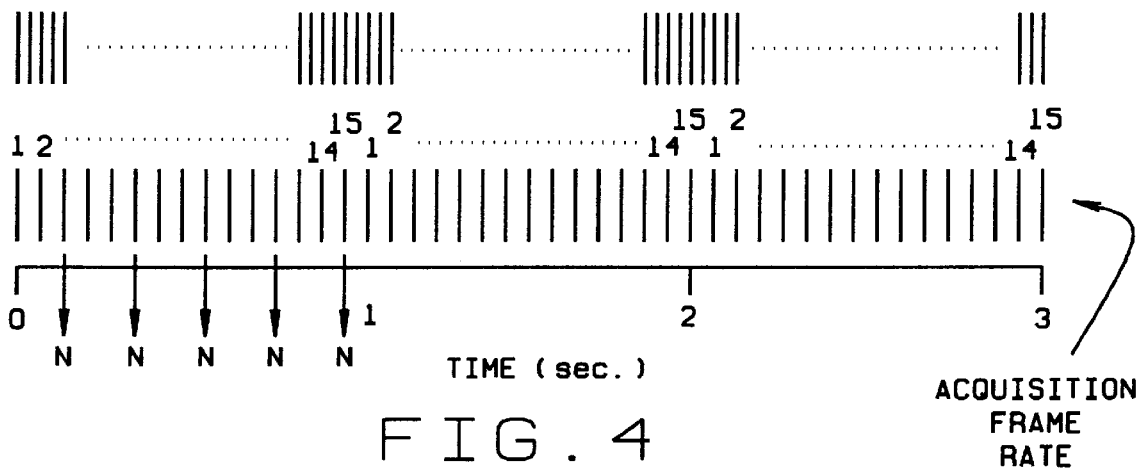
FIG. 4 illustrates the frame rate at which video images are acquired and processed and at which they are retrieved and played back.
Figure 3:
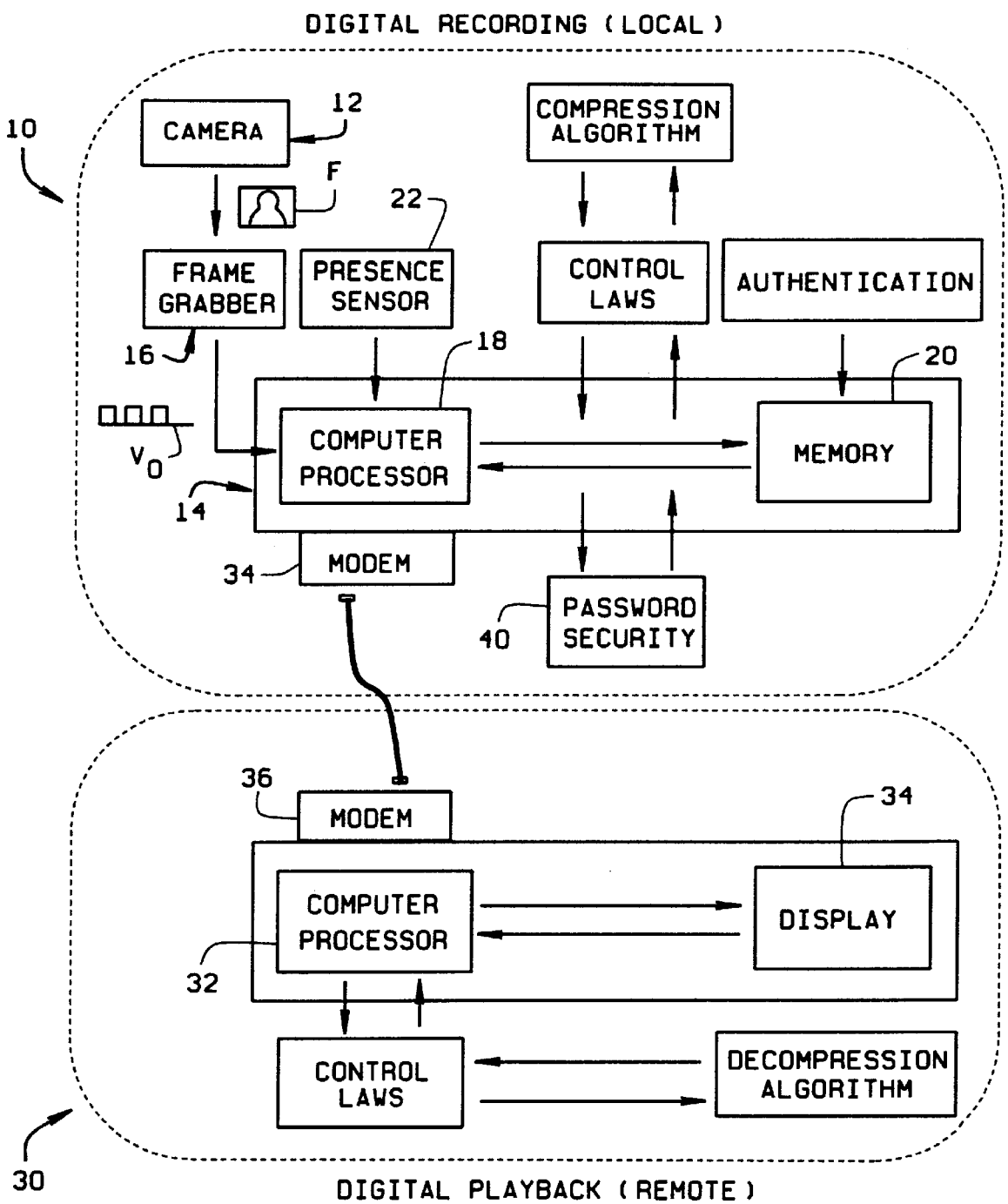
FIG. 3 is a block diagram of a first embodiment of the DVR system of the present invention.

As shown in FIG. 3, a digital video recording system of the present invention is indicated generally 10. The system first includes a camera 12 which can be a conventional video camera. An example of the use of camera 12 is shown in FIG. 1. An ATM machine A comprises an enclosure E. A monitor T, slot L for insertion of a customers ATM card, and pushbuttons B allow the customer to enter transactional information into a cash dispensing system enclosed in the machine. Once a transaction is authorized, cash is dispensed to the customer through a second slot L'. Camera 12 is mounted in the machine above the monitor at a level that allows the camera to obtain a face-on view of the customer. A one-way mirror W is placed in front of the camera. Camera 12 generates video images F at a frame rate which is, as shown in FIG. 4 for example, 15 frames/sec. The video image produced by the camera comprises an analog signal which is provided as an output from the camera. It will understood by those skilled in the art that while camera 12 typically operates in the visible range of the light spectrum, it does not have to. Camera 12 could, for example, be an infrared camera.

The analog signal produced by camera 12 is transmitted from the ATM machine to a processor 14 which is remotely located with respect to the machine. A frame grabber 16 is interposed between the camera and processor. This unit performs two functions. First, as its name suggests, it selects (grabs) frames of video from the stream of video transmitted by the camera. As shown in FIG. 4, frame grabber 16 is programmed to select every $N^{th}$ frame of video from the camera. In FIG. 4, N=3; however, N can be any convenient number. In addition, the frame grabber converts the video signal from an analog signal to a digital signal Vd capable of being processed by processor 14.

Processor 14 comprises two main elements: a processor 18, and a memory 20. The processor is effected, for example, using a personal computer (PC) as a platform, and 20 GBytes of disk memory. Use of a PC enables image processing to be accomplished using any appropriately equipped and programmed computer, whether a desktop, laptop, or other. This greatly enhances the flexibility of the system. The large capacity of memory 20 enables between 50 and 100 days of video imagery to be stored from a single camera 12. Further, unlike conventional video tapes which have a recording (storage) capacity of a but few hours at most, and which is non-expandable, memory 20 is readily expandable.

Figure 6A:
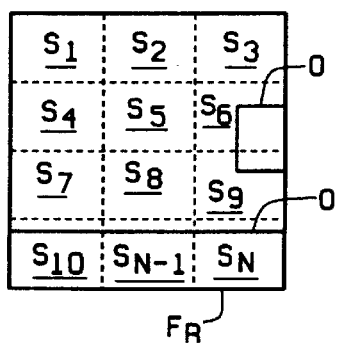
FIGS. 6A and 6B represent a reference image obtained by the camera (FIG. 6A), and an image (FIG. 6B) processed by the system to determine if there are any differences with respect to the reference.
Figure 6B:
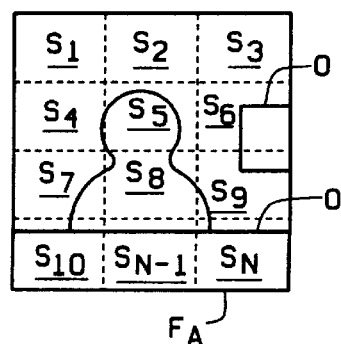

As represented by FIG. 6A, an image obtained by camera 12 is established as a reference against which the contents of subsequently acquired images are compared by processor 18. The image represented by FIG. 6A is, for example, 480 pixels by 640 pixels. Processor 18 divides this image into, for example, 32 pixel by 32 pixel segments S for processing. As shown in FIG. 6A, the image is divided into n segments S1, S2, ... Sn-1, Sn. The contents of each image segment may include all or part of objects O which objects are fixed in the scene. In processing the digital image, processor 18 first compares segment S1 of the reference frame Fr with segment S1 of the frame Fa being analyzed. If the two frame segments compare with each other, the processor goes on to the next two corresponding frame segments S2 and repeats the analysis. In the simplified representations of FIGS. 6A and 6B, processor 18 will note differences in segments S5, S7–S10, Sn-1, and Sn of the frame Fa being scrutinized and reference frame Fr. The processor discards the other frame segments in which there were no differences between the two frames, but now stores the frame segments where differences appear in memory 20.

Processor 14 periodically updates the reference image against which newly acquired frames Fa are compared. Because the system is typically used for security monitoring purposes, it is inefficient for the system to react to every change which may occur in the scene observed by the camera. For example, if the camera in the ATM machine of FIG. 1 observes vehicles or passersby in the vicinity of the machine, it is not necessarily important that their passage be noted. These background changes are not important. What is important are changes in the area immediate the machine. Accordingly, the system incorporates a presence sensor 22 which signals the processor when, for example, someone approaches the machine.

In storing the digital video images in memory 20, processor 14 performs a number of functions. To conserve space in memory 20, the video image is exercised using a compression algorithm which minimizes the amount of information required to be stored, while at the same time insuring that none of the information contained in the image is lost so a high resolution image is always available for viewing. The compression algorithm is used in conjunction with certain control rules which establish the format for storing information in memory 20, and retrieving it from the memory. For different applications, different compression algorithms are used and the particular algorithm for the attendant application is established by the control laws portion of the processor. Further, all stored video images are date and time stamped. That is, the time of day and the date on which the image was recorded is digital data appended to the other digital data representing the image and is stored in the memory with the image contents. An authentication algorithm is also exercised on the data stored in the memory. Authentication of video images is described in U.S. Pat. No. 5,870,471 which is assigned to the same assignee as the present application. Authentication is important for evidentiary purposes in that it prevents someone from tampering with the contents of an image without the tampering being readily detected The authentication algorithm not only provides an immediate indication of tampering, but also provides information as to which part of the image has been tampered with. It will be understood that not every stored image need be authenticated.

After a video image has been processed and its contents stored, the image remains in memory 20 until it is recalled for playback. Since the memory has a large capacity, the image is stored for a substantial period of time; for example, 50–100 days. When memory 20 is full, processor 14 will begin to overwrite the images previously stored, beginning with that image which was first stored. This "first-in, first-out" procedure insures that the more recent images are retained while those which are probably unimportant (since they have not been recalled for viewing during the 50–100 day interval) are deleted. It will be noted that this is in sharp contrast to current video recording systems in which tapes are constantly being reused so that if the importance of a recorded image is not immediately recognized, it has a good chance of being permanently lost.

System 10 further includes a digital playback capability which is indicated generally 30 in FIG. 3. The playback portion of the system includes a processor 32 which again is based on a PC platform. Importantly, the playback portion of the DVR system can be remote from the image processing portion of the system. Accordingly, a modem 34, 36 is located with the respective processors for transmitting commands and data back and forth between them. Transmission is via a standard telecommunications line and image date is transferred at a rate of 56.6 kbps, for example. Processor 32 accesses disk memory 20 through the processor 14 via the modem link. Digital images are then transmitted from the memory via the modem link to processor 32. This processor has an associated display 34 (a television monitor or computer screen, for example) on which the images are viewed. Since the stored images are compressed images, the images received by processor 32 are first decompressed before being viewed. For this purpose, the digital images are first operated on by a decompression algorithm. As shown in FIG. 3, the decompression algorithm is also subject to certain control laws which determine which algorithm of a plurality of algorithms are used. After being decompressed by the appropriate algorithm, the reconstituted image is displayed, the image being the high resolution image presenting substantial detail to the viewer.

The above described invention has several important features over conventional recording systems. First, processor 18 and memory 20 can be remote from the location at which the camera is installed. In addition, the processor 32 and display 34 can be remote from processor 18 and memory 20. Second, the rate at which stored frames of video are acquired from the memory and displayed can be a substantially different than those at which the video images are processed. Third, the playback feature of the system is used simultaneously with the image processing and storage feature. Fourth, stored images are time and date stamped so the processor in the playback portion can go directly to the location in the memory where images are stored to retrieve them so there is no need to scan the memory. Fifth, stored images retrieved from memory 20 can be downloaded to other media with the superior visual qualities of the digital images being maintained.

Because the images are recorded in a digital format, off-loading or downloading images from memory 20 to another memory, regardless of the media in which that is done (diskette, tape, etc.), is accomplished without the loss of quality of the image. Generating multiple copies of the recorded image can also be done without affecting the quality of the image. Not only can the downloading be done to different media, but the rate at which this is done is variable from medium to another, and this can also be done while the system continues to process new images and store them in the memory.

System 10 includes a security system 40 preventing unauthorized persons from accessing the system. System 40 includes, for example, a password security feature which prevents one access to the system unless they possess the appropriate password. As is wellknown in the art, such a system requires the user to, for example, type their password into a comparator which matches the entry against authorized passwords and allows the user access only if there is a match.

Figure 5:
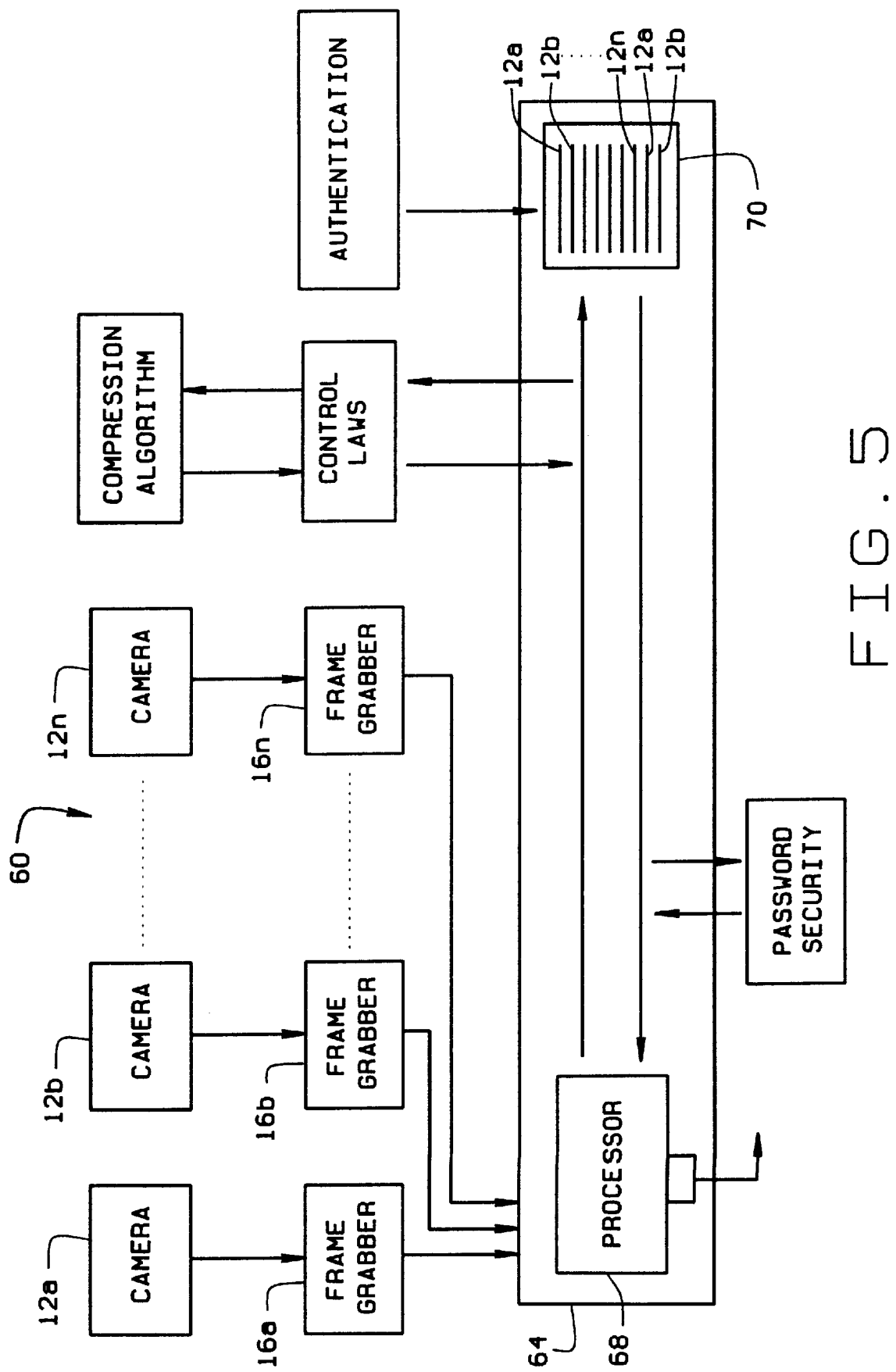
FIG. 5 is a block diagram of a second embodiment of the system.

Referring now to FIG. 5, another embodiment of the system is indicated generally 60. System 60 includes a plurality of cameras 12a–12n, each camera observing different scenes or different aspects of the same scene. Each camera has an associated frame grabber 16a–16n. It will be appreciated that different camera/frame grabber pairs may operate at different frame rates and that processor 64 of the system accommodates all the frame rates for processing purposes. Processor 64 includes a PC based processor 68 and an associated memory. The processor processes a digital signal Vd from each frame grabber and compares the video image represented thereby with a reference frame for the appropriate scene being observed.

After processing, the digital signal is stored in memory 70 after first being compressed using an appropriate compression algorithm. It will be understood that different compression algorithm may be used for all the images stored in the memory; or that a different compression algorithm may be used for each image from a different observed scene.

As with system 10, system 60 includes security system 40 to prevent unauthorized persons from accessing the system.

Although not shown in FIG. 5, system 60 includes a playback capability similar to that of system 10. Operation of the playback portion of the system is similar to that previously described. It will appreciated that, as with the playback portion of system 10, processor 68 and memory 70 are remote from the locations where playback occurs. Again, the rates at which stored frames of video are obtained from memory 70 are different than the rates at which the video images are processed by processor 68 and images are played back simultaneously with newly acquired images being processed and stored. Since the stored images are time and date stamped, the processor of the playback portion of the system can go directly to their storage location in the memory to retrieve the images. Finally, the stored images can be downloaded to other media without loss in the quality of the image.

What has been described is a DVR system for recording financial transactions or other important occurrences. The system employs a video camera, frame grabber, and processor having a memory capability. The system captures, processes and stores video images, and maintains the high resolution (quality) of the stored image regardless of how much times lapses before it is viewed, and how often it is viewed. Review can be done while the system continues to acquire and process new images. Image compression greatly increases the memory storage capability of the system, and image compression ratios are not constant but vary as a function of the aspect of the object viewed and other factors. Recorded images are time and date stamped and authenticated for future usage. The system is expandable for use with multiple cameras and processors and with an expandable memory.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

What is claimed is:

1. A digital video recording system comprising:

a camera directed at a scene of interest to view the scene and generate frames of video images thereof at a predetermined frame rate, each of said frames of video image comprising a plurality of pixel elements;

a converter configured to convert each frame of video image produced by said camera to a digital signal;

a memory configured to store digital signals;

a processor configured to process said digital signal by comparing portions of said video image represented by said digital signal with corresponding portions from a previously established reference of the scene to determine if any changes have occurred therein, said processor configured to compress and store those portions of said video signal which differ from a corresponding portion of said reference in said memory; and, playback means accessing said memory to retrieve the contents of said digital signals and recreate the video images produced by said camera, said playback means accessing said memory at any desired memory location representing a time of interest so as not to have to scan the video images to locate a video image of interest, and said playback means accessing said memory without interrupting said processors processing digital signals representing currently acquired video images.

2. The system of claim 1 wherein said processor time and date stamps said compressed images and stacks said compressed images in said memory in the sequence in which the digital signals are processed.

3. The system of claim 2 wherein once said memory is full, said processor deletes the previously stored compressed images therefrom beginning with the compressed image having the earliest time and date stamp and stores the most recently processed compressed image in its place.

4. The system of claim 1 wherein said processor authenticates stored digital images to preserve the evidentiary value of such images.

5. The system of claim 2 wherein said playback means includes means accessing said memory to access a stored image for any particular date and time without having to scan the stored images to locate a desired image.

6. The system of claim 5 wherein said playback means decompresses a stored image for viewing by an observer.

7. The system of claim 5 in which said playback means accesses a desired image simultaneously with said recorder processing digital signals and storing images represented thereby.

8. The system of claim 7 wherein said playback means can playback images at one frame rate while said camera is simultaneously producing an image of the scene and said processor is processing and storing said image and storing images.

9. The system of claim 1 further including a plurality of cameras each of which is directed at a respective scene of interest to continuously view the scene and generate video images thereof at a predetermined further rate, and means connected to each camera for converting each frame of video image produced by its associated camera to a digital signal, said digital signals each being supplied to said processor.

10. The system of claim 9 wherein said processor interleaves the processed images stored in said memory.

11. The system of claim 8 wherein camera produces images at one frame rate which are acquired and stored in said memory, and said playback means acquires images from said memory at a different frame rate.

12. A method of recording video images and storing and retrieving the same comprising:

viewing a scene of interest with a camera and generating video images thereof;

converting each frame of video imagery produced by said camera to a digital signal;

processing said digital signal, said processing including comparing portions of the video image represented by a digital signal with corresponding portions in a previously established reference of the scene to determine if any changes have occurred therein, and storing the changed portions of the video image represented by said digital signals in a memory in association with date and time data; and, accessing said memory to retrieve said digital signals to recreate the video images produced by said camera, said memory being accessed to retrieve said video images simultaneously with digital signals being stored therein, and said memory being accessed at any desired location representing an associated time of interest whereby video images stored in said memory do not need to be sequentially scanned to locate a video image of interest.

13. The method of claim 12 wherein said video images are acquired from said camera at one frame rate and from said memory at a second frame rate.

14. The method of claim 12 further including authenticating stored video images for evidentiary purposes.

15. The method of claim 12 further including a plurality of cameras each of which is directed at a respective scene of interest, and the method further includes each camera continuously viewing each respective scene and generating video images thereof at a predetermined frame rate, converting each frame of video image from each camera to a signal, processing each digital signal and storing the processed video images in the memory.

16. The method of claim 15 wherein said processor interleaves processed images stored in said memory.

* * * * *

UNITED STATES PATENT AND TRADEMARK OFFICE
CERTIFICATE OF CORRECTION

PATENT NO. : 6,317,152 B1  
DATED : November 13, 2001  
INVENTOR(S) : Hobson et al.

Page 1 of 1

It is certified that error appears in the above-identified patent and that said Letters Patent is hereby corrected as shown below:

Column 2,
Line 45 replace "ATI" with -- ATM --

Column 3,
Line 33, replace "fill" with -- full --

Signed and Sealed this

Twenty-first Day of May, 2002

Attest:

Attesting Officer

JAMES E. ROGAN
Director of the United States Patent and Trademark Office